(12) United States Patent  
Scott et al.

(10) Patent No.: US 7,905,156 B2  
(45) Date of Patent: Mar. 15, 2011

(54) SINGLE CHAIN LINEAR ACTUATOR

(75) Inventors: Jon Scott, Vancouver (CA); Eric Fetchko, Burnaby (CA)

(73) Assignee: Teleflex Canada, Richmond (CA)

( * ) Notice: Subject to any disclaimer, the term of this patent is extended or adjusted under 35 U.S.C. 154(b) by 344 days.

(21) Appl. No.: 12/033,173

(22) Filed: Feb. 19, 2008

(65) Prior Publication Data

US 2008/0199295 A1 Aug. 21, 2008

Related U.S. Application Data

(60) Provisional application No. 60/890,688, filed on Feb. 20, 2007.

(51) Int. Cl.
*F16H 27/02* (2006.01)
(52) U.S. Cl. ..................................................... 74/89.21
(58) Field of Classification Search ............ 74/89, 89.25, 74/89.2, 89.21; 474/64, 65, 206, 219, 227; 254/266; 414/744.1
See application file for complete search history.

(56) References Cited

U.S. PATENT DOCUMENTS

| | | | | |
|---|---|---|---|---|
| 980,181 A | * | 1/1911 | Asbury | 89/47 |
| 1,221,471 A | * | 4/1917 | Miller | 474/164 |
| 3,742,775 A | * | 7/1973 | Hayes et al. | 474/140 |
| 4,210,031 A | * | 7/1980 | Schmid | 74/89.21 |
| 4,719,840 A | * | 1/1988 | Goodell et al. | 89/47 |
| 4,819,495 A | | 4/1989 | Hormann | |
| 5,271,182 A | | 12/1993 | Greisner | |
| 6,530,177 B1 | | 3/2003 | Sorensen | |
| 2008/0200294 A1 | * | 8/2008 | Scott et al. | 474/230 |
| 2009/0211220 A1 | * | 8/2009 | Scott et al. | 59/89 |

FOREIGN PATENT DOCUMENTS

| | | |
|---|---|---|
| EP | 1 484 465 | 12/2004 |
| GB | 422 781 | 1/1935 |
| GB | 466 786 | 6/1937 |
| GB | 2 159 600 | 12/1985 |
| WO | WO 2005/033455 | 4/2005 |
| WO | WO 2005/108821 | 11/2005 |

\* cited by examiner

*Primary Examiner* — Vicky A Johnson
(74) *Attorney, Agent, or Firm* — Baker & Hostetler LLP

(57) ABSTRACT

A linear actuator comprises a chain having adjacent first and second links. A pivotal connection pivotally connects the first link to the second link. The first link is pivotable about a pivot axis which is non-perpendicular to a longitudinal axis of the first link. A locking mechanism releasably locks the first link and the second link to prevent the first link from pivoting about the pivot axis. A releasing mechanism releases the locking mechanism to allow the first link to pivot about the pivot axis. A drive mechanism moves the chain between an extended position and a retracted position. At least a portion of the chain is helically wound when the chain is in the retracted position.

12 Claims, 9 Drawing Sheets

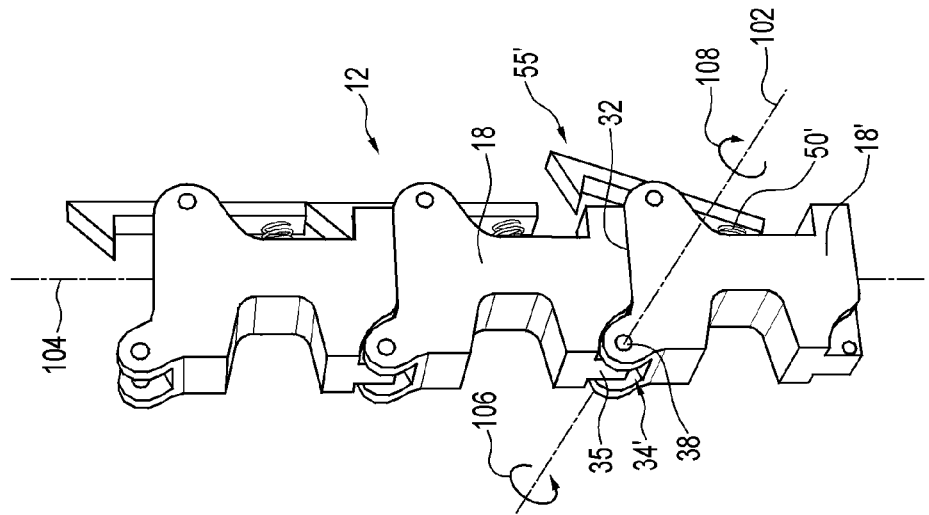
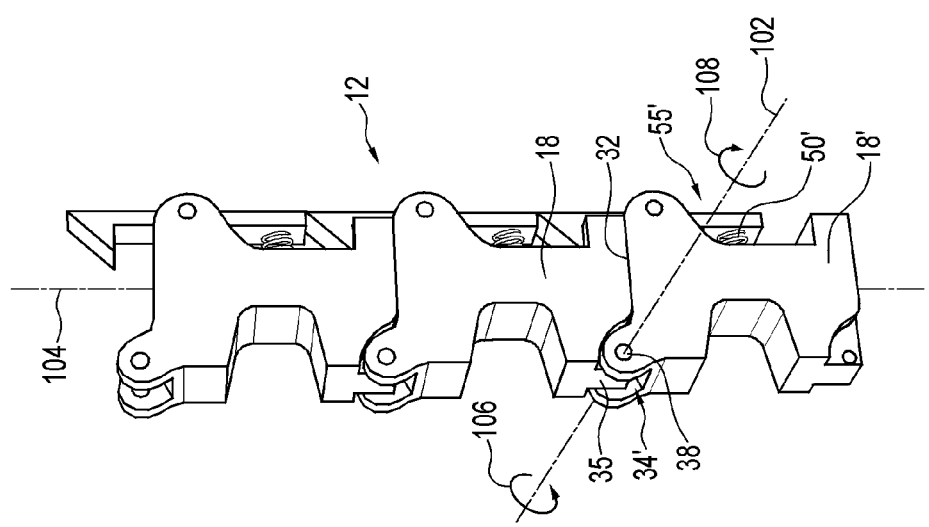

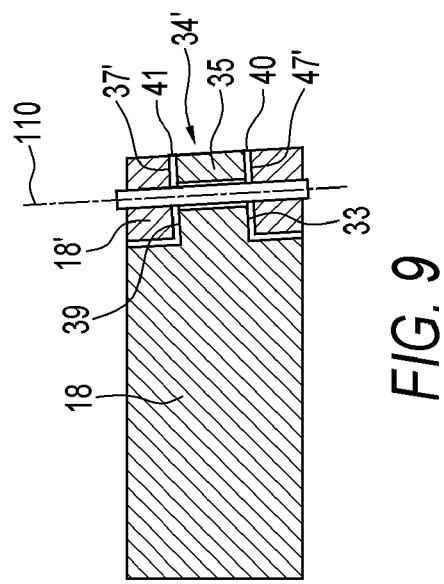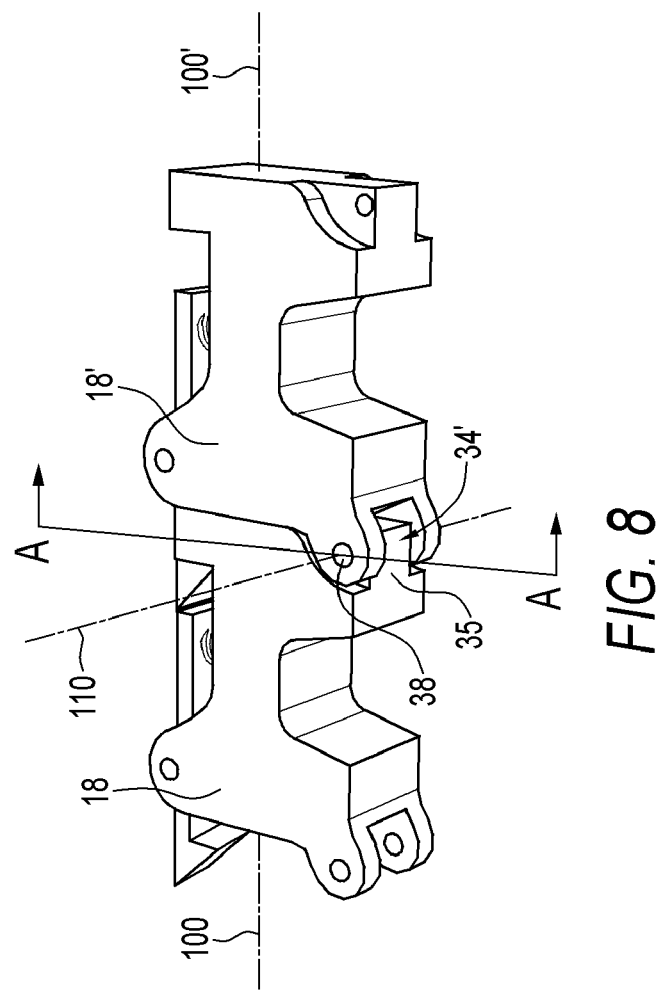

SINGLE CHAIN LINEAR ACTUATOR

CROSS REFERENCE TO RELATED APPLICATION

This application claims the benefit of provisional application 60/890,688 filed in the United States Patent and Trademark Office on Feb. 20, 2007, the disclosure of which is incorporated herein by reference and priority to which is claimed.

BACKGROUND OF THE INVENTION

The present invention relates to a single chain linear actuator and, in particular, to a single chain linear actuator having helically winding chains.

One measure of a linear actuator is the ratio of extended length to retracted length. For most linear actuators this ratio is 1.8 to 1. Although, there are linear actuators, such as scissor lifts and telescoping hydraulic jacks, in which the ratio of extended length to retracted length exceeds 3 to 1. This allows such linear actuators to provide a relatively large amount of movement while being positioned in a relatively small space. However, these linear actuators typically have a poor side load stiffness and/or require oil. For example, telescoping hydraulic jacks do not have particularly good side load stiffness and require oil. Accordingly, telescoping hydraulic jacks cannot be used in applications which require a good side load carrying capacity or where the use oil is not permissible.

It is known to provide linear actuators having extending and retracting chains, with inter-connected links, as disclosed in U.S. Pat. No. 5,271,182 to Greisner et al., and European Patent Application Number 1,484,465 to Soerensen. These prior art linear actuators have a good side load stiffness and do not require oil. However, they do not have a large extended length to retracted length ratio because a planar chain track, or chain path, is required within the actuator housing to guide the chain as it is being displaced. As a result, these types of linear actuators are typically used in applications where limited movement is required, or where there is no requirement for the linear actuator to be stored in a relatively small space.

SUMMARY OF THE INVENTION

The present invention provides a linear actuator having a helically winding chain, with inter-connected links, that does not require a planar chain track or chain path chain within the actuator housing. This allows for a linear actuator that does not require oil and has a large extended length to retracted length ratio, good axial stiffness, and good side load stiffness.

In particular, there is provided a linear actuator comprising a chain having adjacent first and second links. A pivotal connection pivotally connects the first link to the second link. The first link is pivotable about a pivot axis which is non-perpendicular to a longitudinal axis of the first link. A locking mechanism releasably locks the first link and the second link to prevent the first link from pivoting about the pivot axis. A releasing mechanism releases the locking mechanism to allow the first link to pivot about the pivot axis. A drive mechanism moves the chain between an extended position and a retracted position. At least a portion of the chain is helically wound when the chain is in the retracted position.

BRIEF DESCRIPTION OF THE DRAWINGS

Referring to the drawings:

FIG. 5 is a perspective view showing a plurality of inter-connected links of the linear actuator of FIG. 1 aligned along a common axis with a locking mechanism in an engaged position;

FIG. 6 is a perspective view showing a plurality of inter-connected links of the linear actuator of FIG. 1 aligned along a common axis with a locking mechanism in a released position;

FIG. 8 is an perspective view showing a link and an adjacent link of a chain of the linear actuator of FIG. 1 aligned along a common axis;

FIG. 9 is a sectional view taken along line A-A of FIG. 7;

DETAILED DESCRIPTIONS OF THE PREFERRED EMBODIMENTS

Figure 1:
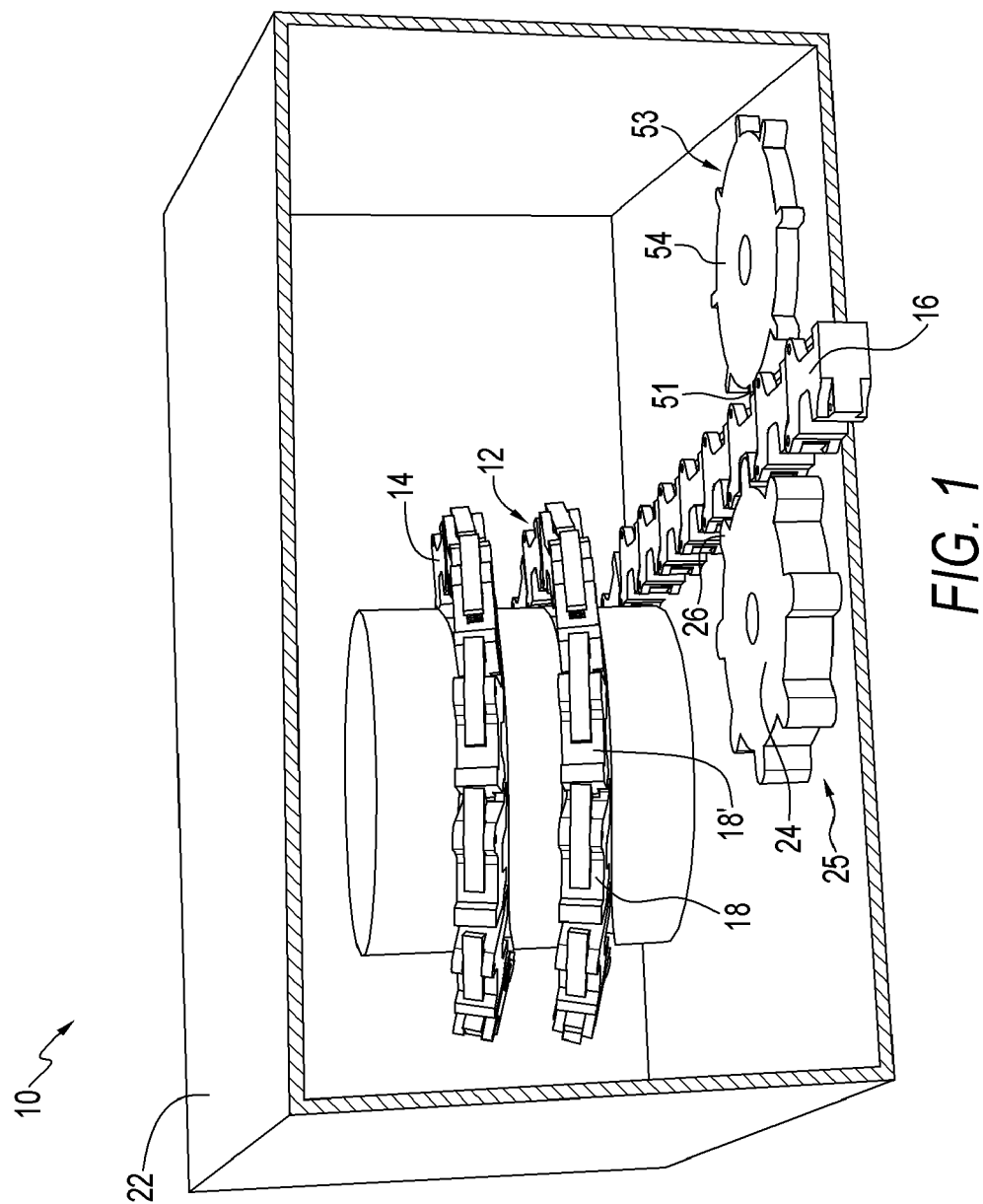
FIG. 1 is a front perspective, sectional view showing a linear actuator with a single chain in a retracted position.

Referring to the drawings, and first to FIG. 1, this shows a single chain linear actuator 10. The linear actuator 10 comprises a helically winding chain 12 which is reciprocatingly received in an actuator housing 22. The chain 12 has a proximal end link 14, a distal end link 16, and a plurality of inter-connected links 18 therebetween. The chain 12 is movable between a retracted position shown in FIGS. 1 and 2, and an extended position shown in FIG. 3.

Figure 4:
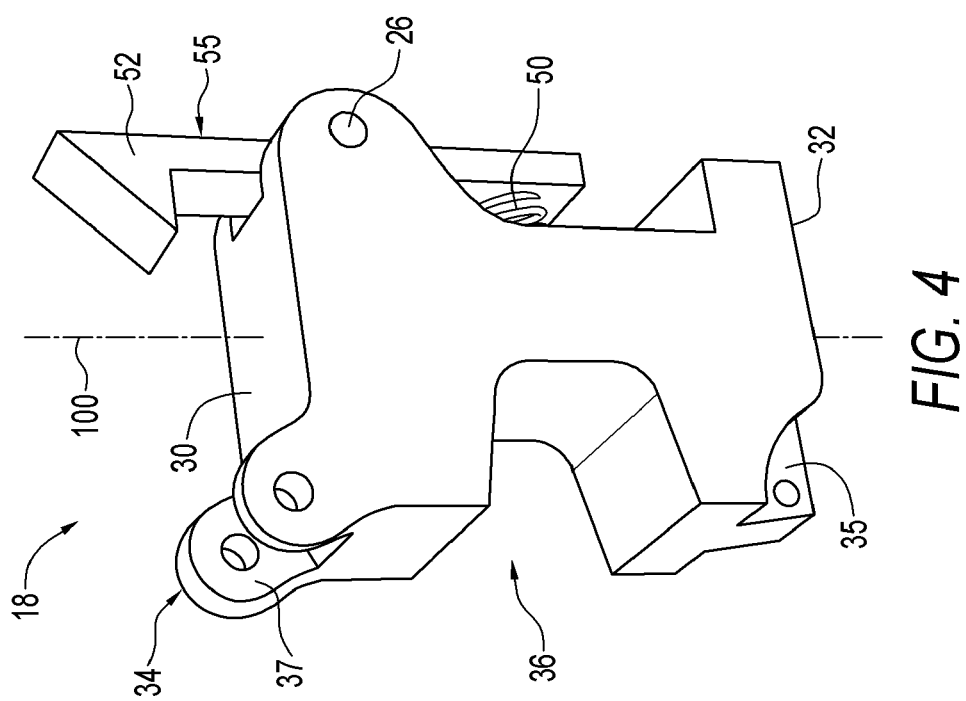
FIG. 4 is a perspective view showing a link of the linear actuator of FIG. 1 in greater detail.

Referring now to FIG. 4, a first one of the inter-connected links 18 is shown in greater detail. The link 18 has a first end 30, a second end 32, and a longitudinal axis 100. There is a clevis 34 at the first end 30 of the link 18. The clevis 34 has opposed inner mating surfaces. In FIG. 4 only one of the mating surfaces 37 is shown. The inner mating surfaces are angularly tilted relative to the first end 30 of the link 18. There is a mating portion 35 near the second end 32 of the link 18. The mating portion 35 is angularly tilted relative to the second end 32 of the link 18. The link 18 is further configured to define a recess 36.

A locking mechanism 55 is connected to the link 18. In this example, the locking mechanism includes a latch 52 which is pivotably connected to the link 18 by a pin 26. The latch 52 is biased by a resilient member, in the form of a spring 50, to releasably engage and lock another link (not shown) as will be discussed in greater detail below. The inter-engaging, or locking, of the links increases the axial load stiffness and side load stiffness of the actuator 10.

Figure 7:
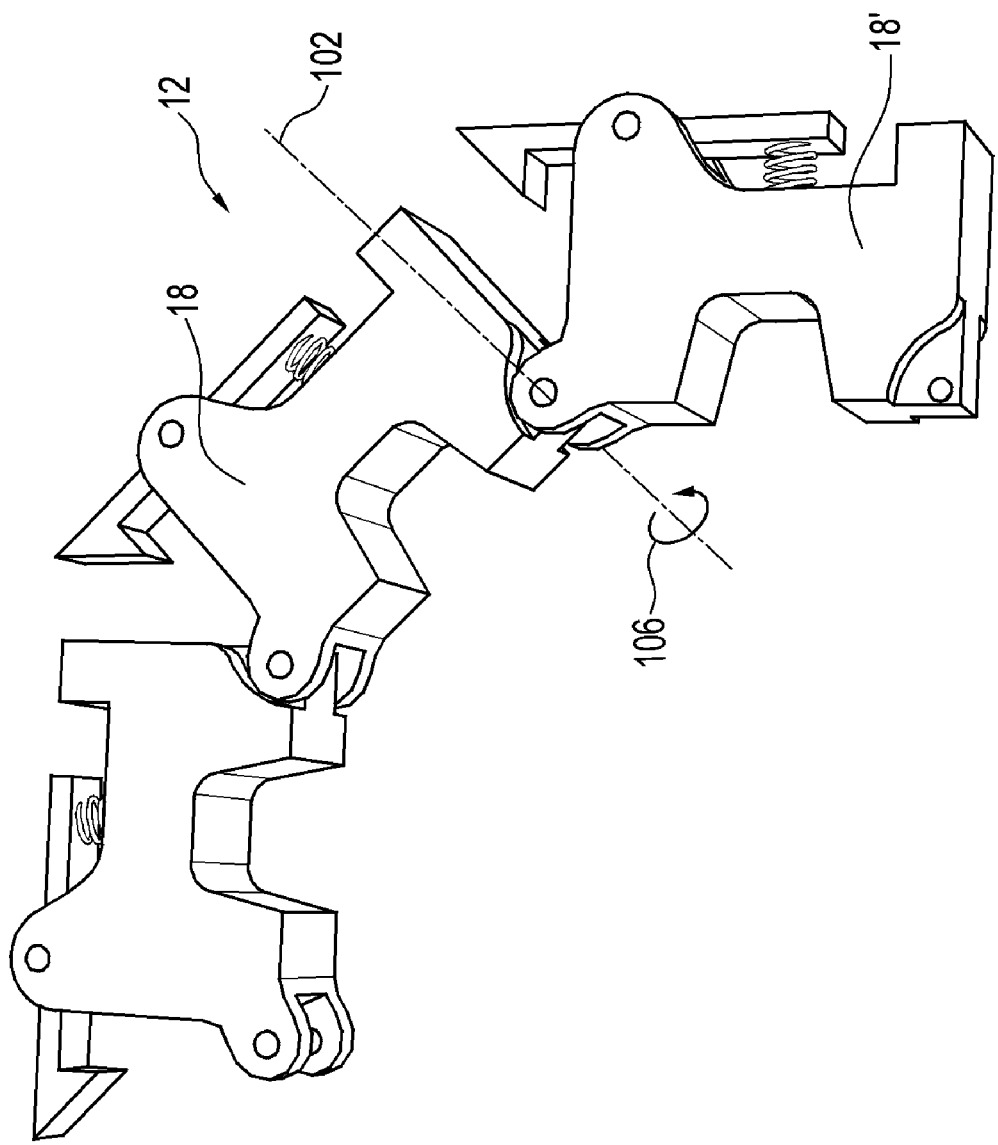
FIG. 7 is a perspective view showing a plurality of inter-connected links of the chain of FIG. 1 extending about a curve.

As best shown in FIG. 5, the link 18 is pivotably connected, at its mating portion 35, to the clevis 34' of an adjacent second link 18' by a pivotal connection. In this example, the pivotal connection is a pin 38. The link 18 is pivotable about a pivot axis 102 which is non-perpendicular to the longitudinal axis 100 of the link 18 which shown in FIG. 4. Referring back to FIG. 5, when the when the link 18 and the adjacent link 18' are aligned along a common longitudinal axis 104, the locking mechanism 55' of the adjacent link 18' is biased by the spring 51' to engage the link 18. This prevents the link 18 from pivoting about the pivot axis 102 in a first direction. The first direction is indicated generally by reference arrow 106. The link 18 itself is configured to prevent pivoting in a second direction when the link 18 and the adjacent link 18' are aligned along the common longitudinal axis 104. The second direction is indicated generally by reference numeral 108 and is opposite to the first direction 106. In this example, the second end 32 of the link 18 abuts the adjacent link 18' when the link 18 and the adjacent link 18' are aligned along the common longitudinal axis 104. The adjacent link 18' thereby acts as a stop to prevent the link 18 from pivoting in the second direction 108. Referring now to FIG. 6, the locking mechanism 55' of the adjacent link 18' may be actuated, by applying a force to the spring 50', to release the link 18 as will be described in greater detail below. This allows the link 18 to pivot about the pivot axis 102 in the first direction 106 as shown in FIG. 7.

The pivotable connection between the link 18 and the adjacent link 18' is best shown in FIGS. 8 and 9. The link 18 is connected, at its mating portion 35, by the pin 38, to the inner mating surfaces 37' of the clevis 34' of the adjacent link 18'. The pin 38 has a longitudinal axis 110. The longitudinal axis 110 of the pin 38 is co-axial with the pivot axis 102 which is shown in FIGS. 5 and 6. As best shown in FIG. 8, the longitudinal axis 110 of the pin 38 is non-perpendicular to the longitudinal axis 100 of the link 18. As best shown in FIG. 9, the longitudinal axis 110 of the pin 38 is also perpendicular to the inner mating surfaces 37' and 47' of the clevis 34' of the adjacent link 18'. Preferably the pin 38 is tilted in a plane which is perpendicular to the longitudinal axis 100 of the link 18, and a plane which is parallel to the longitudinal axis 100 of the link 18. However, the pin 38 only needs to be tilted in one of the planes.

There are gaps 40 and 41 between the inner surfaces 37' and 47' of the clevis 34' of the adjacent link 18' and longitudinal side surfaces 33 and 39 of the link 18. The gaps 40 and 41 allow the link 18 to pivot about the pin 38 in a non-perpendicular manner relative to a longitudinal axis 100' of the adjacent link 18'. The link 18 is accordingly allowed to pivot between a position in which the link 18 is co-planar with the adjacent link 18' and a position in which the link 18 is non co-planar with the adjacent link 18'. This allows the chain 12 to helically wind, as shown in FIGS. 1 and 2.

Figure 2:
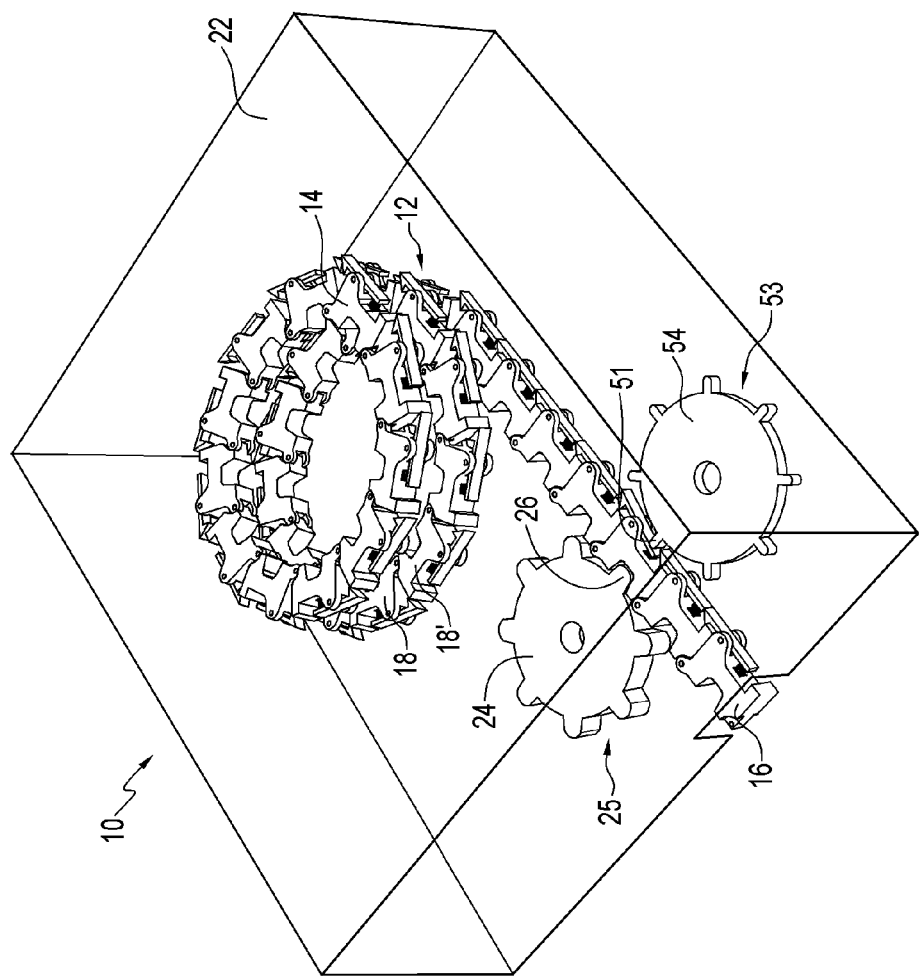
FIG. 2 is a top isometric view showing the linear actuator of FIG. 1 with the actuator housing shown in ghost.
Figure 3:
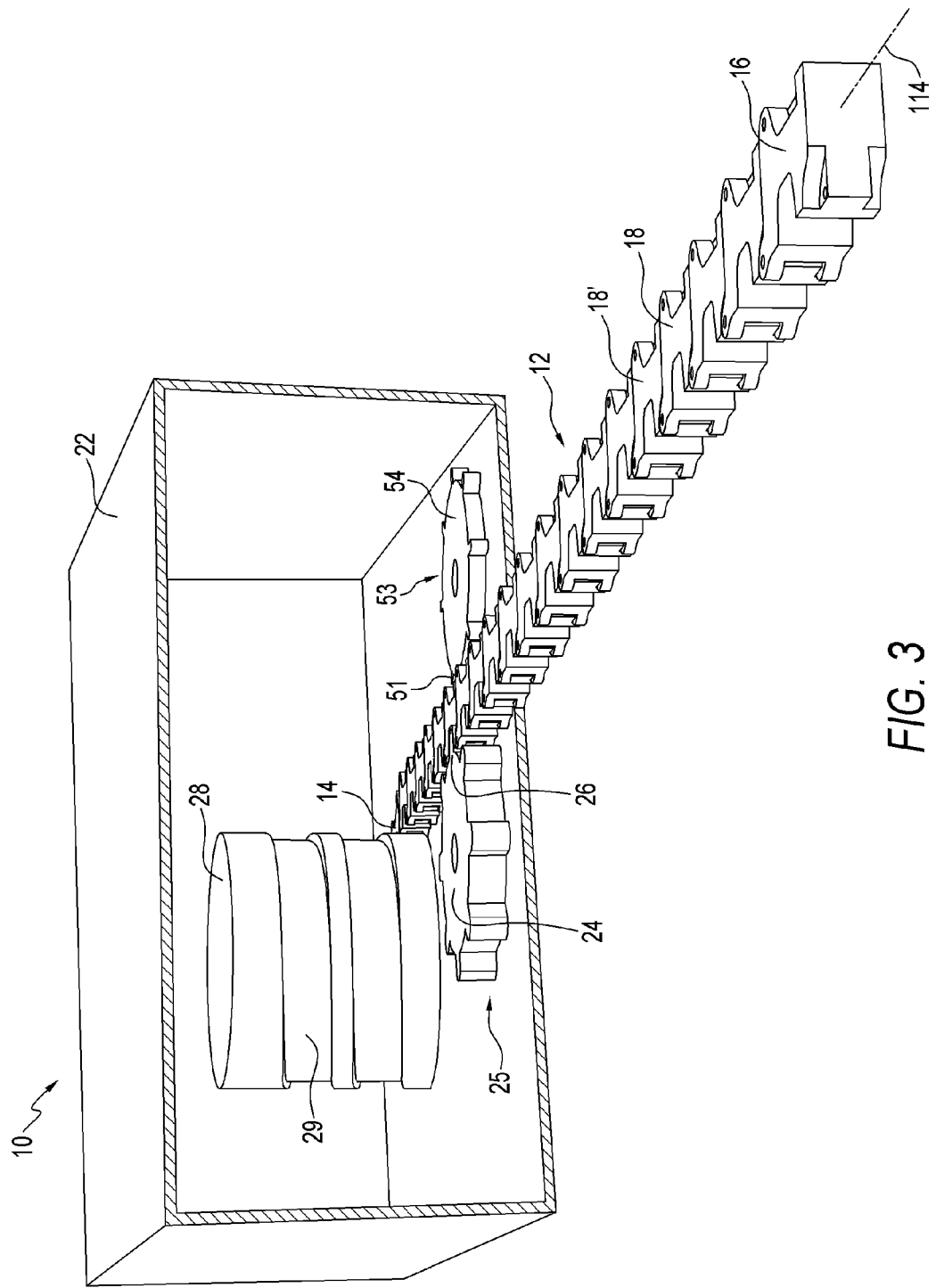
FIG. 3 is a front perspective, sectional view showing the linear actuator of FIG. 1 with the chain in an extended position.

In this example, a drive mechanism 25, shown in FIGS. 1 to 3, moves the chain 12 between the retracted position shown in FIGS. 1 and 2, and the extended position in FIG. 3. As shown in FIGS. 1 and 2, in the retracted position, the distal end link 16 of the chain 12 is substantially disposed within the actuator housing 22 and at least a portion of the chain 12 is helically wound about a rollers 28. The roller 28 is disposed with the actuator housing 22. As shown in FIG. 3, in the extended position, the chain 12 extends at least partially and linearly outside the actuator housing 22 with the distal end link 16 disposed outside the actuator housing 22. At least one interconnected link 18 of the chain 12 is aligned along a common axis 114 with at least one adjacent inter-connected link 18' when the chain 12 is in the extended position.

The drive mechanism 25 includes a sprocket 24 which is powered by a motor (not shown). The sprocket 24 has sprocket teeth 26 which engage the recess 36 of the link 18 to move the chain 12 between the retracted position and the extended position. A releasing mechanism 53, which is also shown in FIGS. 1 to 3, cooperates with the drive mechanism 25 as the chain 12 is being moved. In this example, the releasing mechanism 53 also includes a sprocket 54 which is powered by a motor (not shown). The sprocket 54 of the releasing mechanism 53 has sprocket teeth 51 which actuate latches of respective ones of the locking mechanisms on the links to release or engage a corresponding link.

Figure 10:
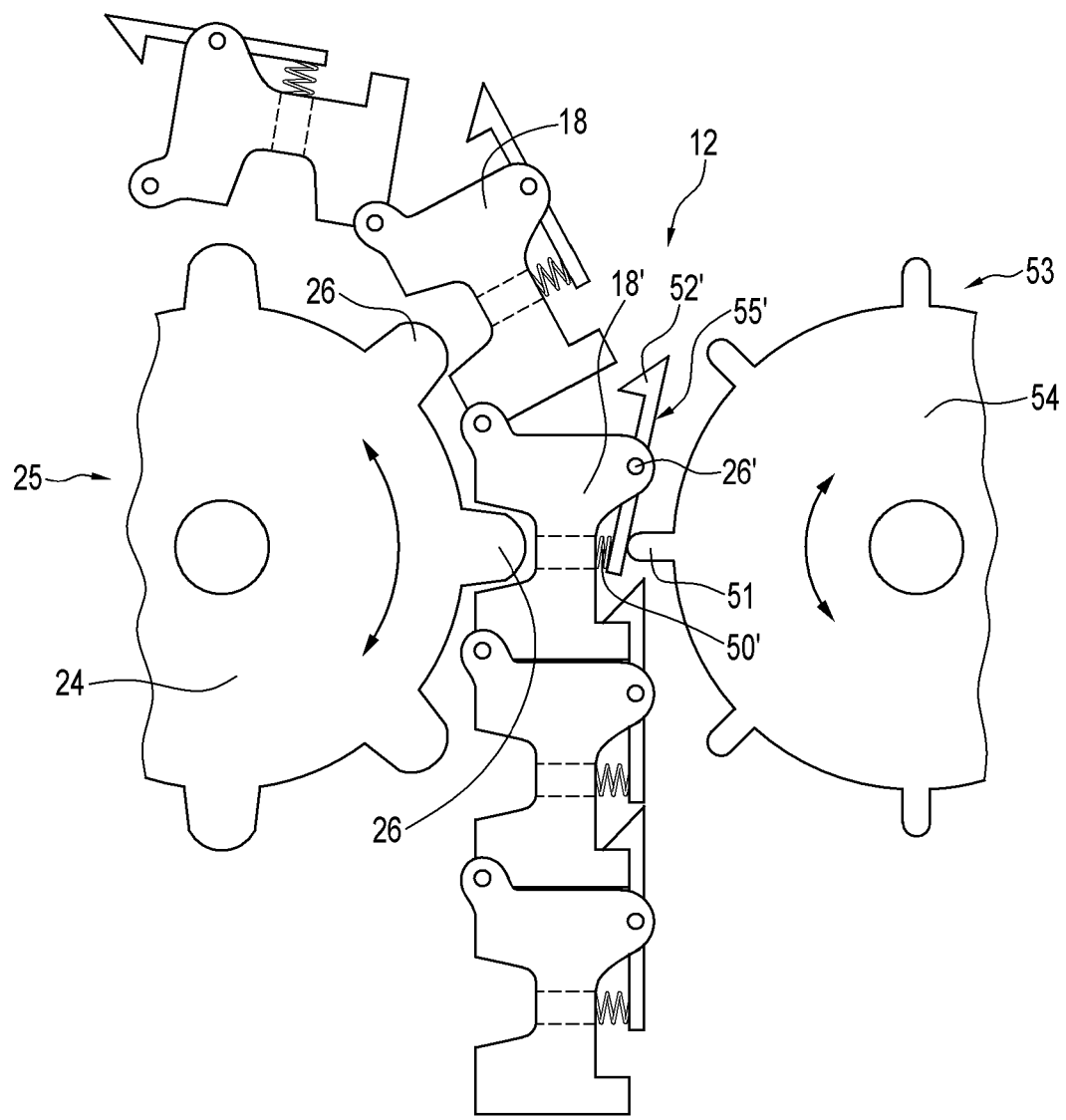
FIG. 10 is a fragmentary, top plan view of the linear actuator of FIG. 1.

As best shown in FIG. 10, as the link 18 is engaged by the drive mechanism 25, sprocket teeth 51 of the releasing mechanism 53 apply a force against the spring 50' of the locking mechanism 55' of the adjacent link 18'. This causes the latch 52' of the locking mechanism 55' to pivot about the pivot pin 26' and release the link 18. The link 18 is thereby allowed to pivot as shown in the FIG. 7. Accordingly, the chain 12 may be moved around the roller 28 along a channel 29 which is shown in FIG. 3. The channel 29 is ramped allowing the chain 12 to be stored in a plurality of levels within the actuator housing 22. This allows for compact storage of the chain 12 resulting in a linear actuator that does not require oil and has a large extended length to retracted length ratio, good axial stiffness, and good side load stiffness.

Figure 11:
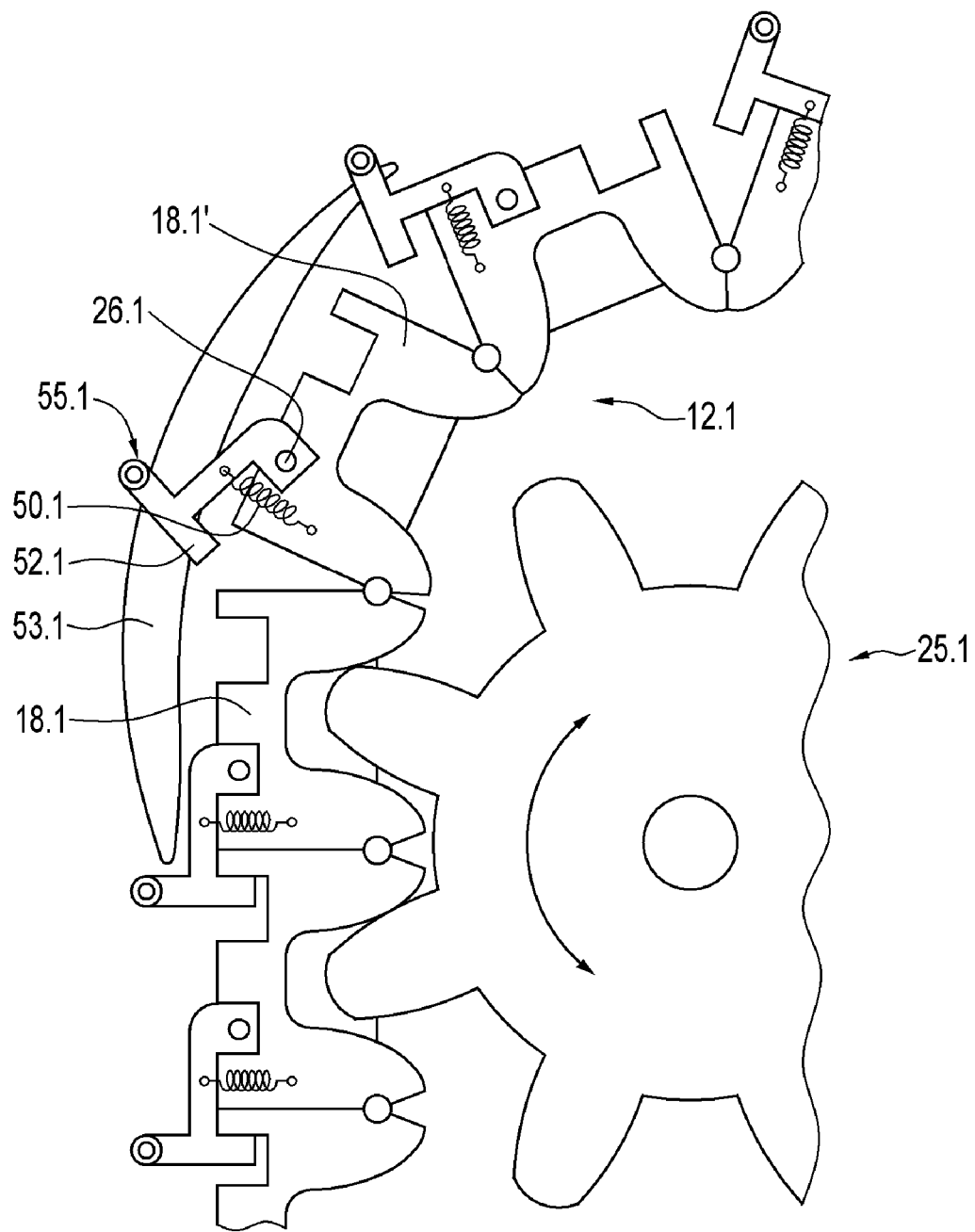
FIG. 11 is a fragmentary, top plan view of a single chain linear actuator according to another embodiment.

FIG. 11 shows a chain 12.1, locking mechanism 55.1, drive mechanism 25.1, and release mechanism 53.1 of a single chain linear actuator according to another embodiment. In FIG. 11 functional like parts have been given like reference numerals as in FIGS. 1 to 10 with the additional numerical designation "0.1". It will therefore be understood, by a person skilled in the art, that modifications may be made various components of the linear actuator 10 disclosed herein without departing from the scope of the invention. In the embodiment of FIG. 11, as the link 18 is engaged by the drive mechanism 25.1, the locking mechanism 55.1' of the adjacent link 18.1' passes over the release mechanism 53.1 which in this example is in the form of a crescent shaped rocker bar. This causes a spring 50.1' of the locking mechanism 55.1' to extend and a latch 52.1' of the locking mechanism 55.1' to pivot about a pivot pin 26.1' and release the link 18.1. The link 18.1 is thereby allowed to pivot and the chain 12.1 helically wind.

It will be understood by someone skilled in the art that many of the details provided above are by way of example only and are not intended to limit the scope of the invention which is to be determined with reference to the following claims.

What is claimed is:

1. A linear actuator comprising:
   a chain having a first link and a second link, the second link being adjacent to the first link;
   a pin pivotally connecting the first link to the second link, the pin having a longitudinal axis which is non-perpendicular to a longitudinal axis of the first link and co-axial with a pivot axis about which the first link is pivotable;
   a locking mechanism for releasably locking the first link and the second link to prevent the first link from pivoting about the pivot axis;
   a releasing mechanism for releasing the locking mechanism to allow the first link to pivot about the pivot axis; and
   a drive mechanism for moving the chain between an extended position and a retracted position, wherein at least a portion of the chain is helically wound when the chain is in the retracted position.

2. The linear actuator as claimed in claim 1, wherein the first link and the second link are longitudinally aligned along a common axis when the chain is in the extended position.

3. The linear actuator as claimed in claim 1, wherein the first link is pivotable about the pivot axis in a first direction only when the first link and the second link are aligned along a common axis and the locking mechanism is released.

4. The linear actuator as claimed in claim 3, wherein the second link acts as a stop to prevent the first link from pivoting about the pivot axis in a second direction when the first link and the second link are aligned along the common axis, the second direction being opposite to the first direction.

5. The linear actuator as claimed in claim 1, wherein the locking mechanism includes a latch pivotably connected to the second link, the latch being biased to engage the first link.

6. The linear actuator as claimed in claim 5, wherein the releasing mechanism includes means for pivoting the latch to release the first link.

7. The linear actuator as claimed in claim 1, wherein the first link and the second link each have a recess and the drive mechanism includes a sprocket with sprocket teeth, the sprocket teeth engaging the recesses to move the chain between the extended position and the retracted position.

8. The linear actuator as claimed in claim 1, further including an actuator housing, the chain extending at least partially and linearly outside the actuator housing when the chain is in the extended position.

9. The linear actuator as claimed in claim 8, further including a roller disposed within the actuator housing, the chain being at least partially ramped about the roller when the chain is in the retracted position.

10. The linear actuator as claimed in claim 1, wherein the first link includes a mating portion and the second link includes a clevis, the mating portion of the first link being received by the clevis of the second link and the pin coupling the mating portion of the first link to the clevis of the second link.

11. The linear actuator as claimed in claim 10, wherein side surfaces of the mating portion of the first link are spaced apart from inner surfaces of the clevis of the second link.

12. The linear actuator as claimed in claim 10, wherein side surfaces of the mating portion of the first link are tilted and inner surfaces of the clevis of the second link are tilted.

* * * * *